United States Patent

Scott et al.

Patent Number: 5,740,985
Date of Patent: Apr. 21, 1998

[54] LOW EARTH ORBIT PAYLOAD LAUNCH SYSTEM

[76] Inventors: Harry Scott, 5546 W. 122nd St., Hawthorne, Calif. 90250; Stephen G. Wurst, 4140 Derby Cir., Lancaster, Calif. 93536

[21] Appl. No.: 716,807

[22] Filed: Sep. 16, 1996

[51] Int. Cl.[6] .................... B64G 1/14; B64G 1/40
[52] U.S. Cl. .................... 244/2; 244/160; 244/169; 244/172; 244/63; 244/137.4; 244/139
[58] Field of Search .................... 244/1 TD, 2, 158 R, 244/160, 164, 169, 172, 158 A, 63, 137.1, 137.4, 138 R, 139

[56] References Cited

U.S. PATENT DOCUMENTS

| | | | |
|---|---|---|---|
| 3,702,688 | 11/1972 | Faget | 244/162 |
| 4,265,416 | 5/1981 | Jackson et al. | 244/2 |
| 4,451,017 | 5/1984 | Marshall | 244/172 |
| 4,557,444 | 12/1985 | Jackson et al. | 244/172 |
| 4,709,883 | 12/1987 | Giuliani | 244/63 |
| 4,724,738 | 2/1988 | Johnson | 244/63 X |
| 4,802,639 | 2/1989 | Hardy et al. | 244/2 |
| 4,901,949 | 2/1990 | Elias | 244/63 X |
| 5,090,642 | 2/1992 | Salkeld | 244/158 R |
| 5,141,181 | 8/1992 | Leonard | 244/172 |
| 5,295,642 | 3/1994 | Palmer | 244/2 |
| 5,397,082 | 3/1995 | Scott | 244/2 X |
| 5,402,965 | 4/1995 | Cervisi et al. | 244/2 |
| 5,626,310 | 5/1997 | Kelly | 244/2 |

*Primary Examiner*—William Grant
*Attorney, Agent, or Firm*—Dennis W. Beech

[57] ABSTRACT

The orbital launch system is a three stage vehicle to launch orbital payloads. The system uses a turbofan powered aircraft as the first stage with an aerospacecraft attached by an underling aerospacecraft pylon at an aircraft engine mount for carriage. The aerospacecraft is the second stage and is powered by an ejector ramjet engine. The aerospacecraft has a cargo bay with cargo bay doors in its midsection. A booster rocket with payload is launched from the cargo bay by use of an ejection system. Normally the payload is mounted on a rocket booster to be placed in the proper orbit. The orbital launch system may also have a parachute drop recovery system to recover the booster rocket after it deorbits.

8 Claims, 7 Drawing Sheets

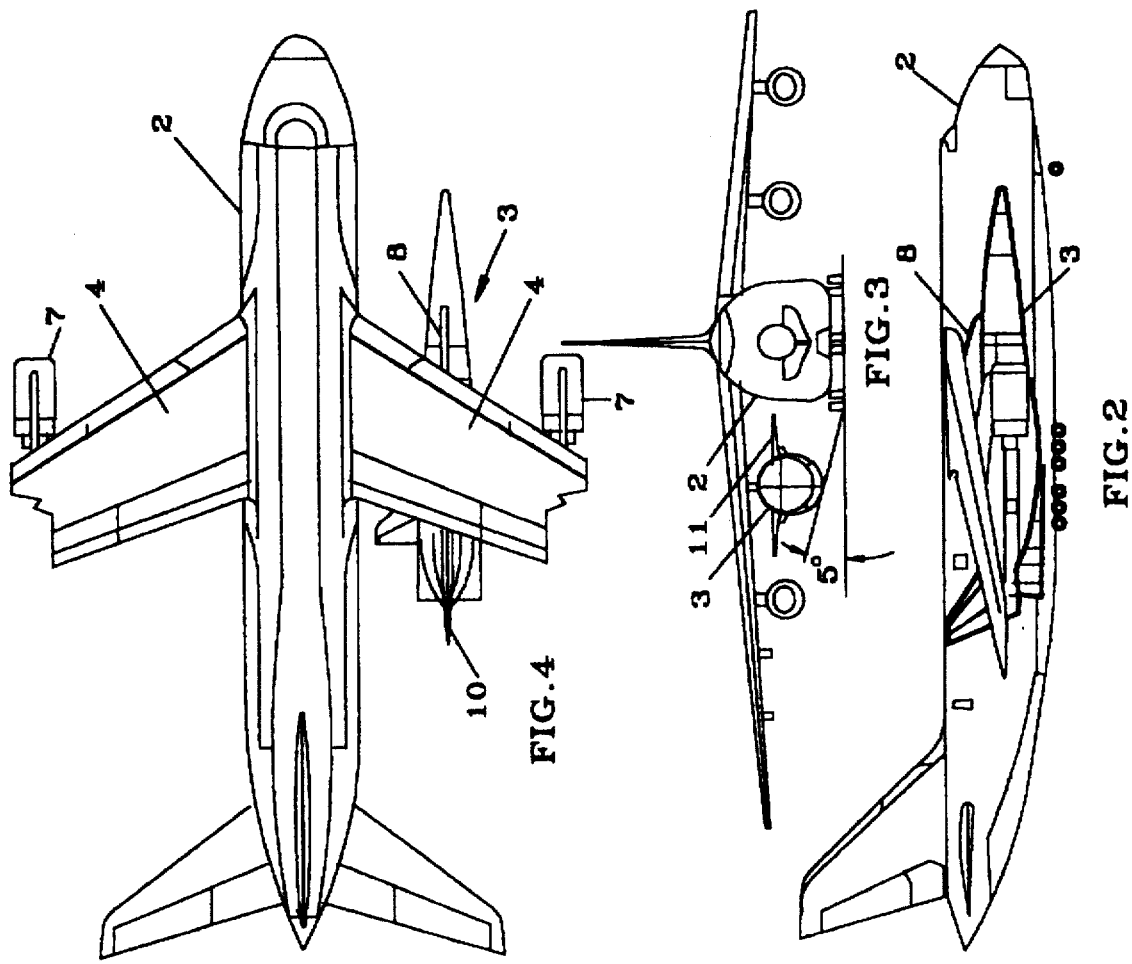

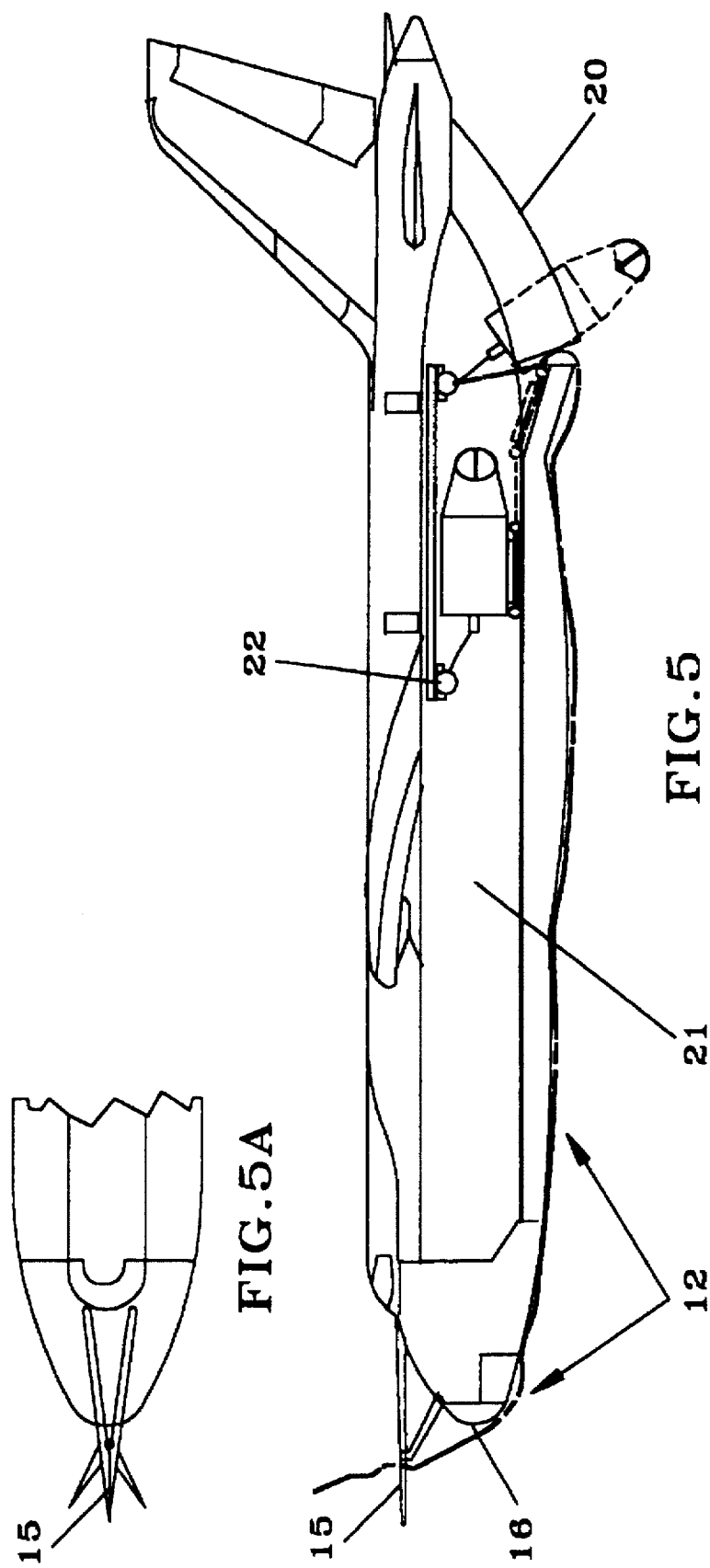

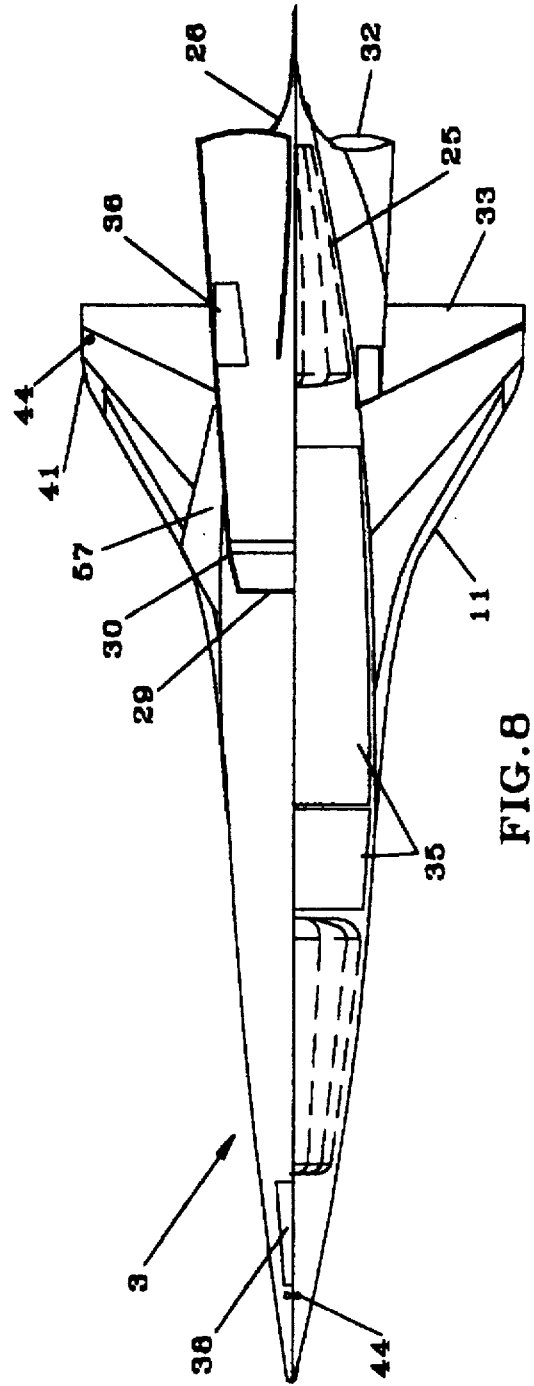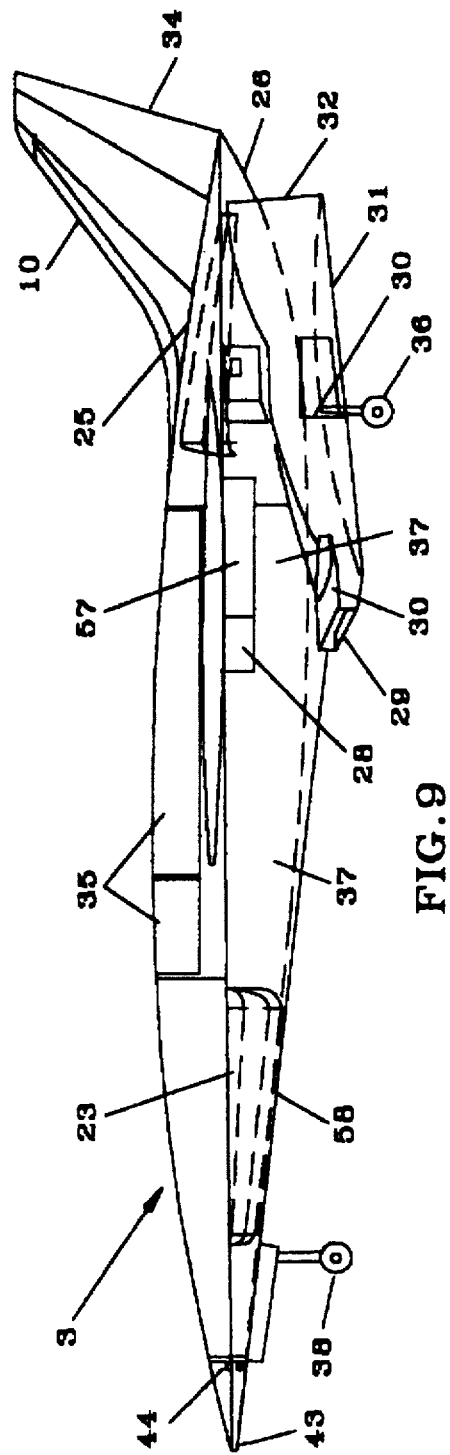

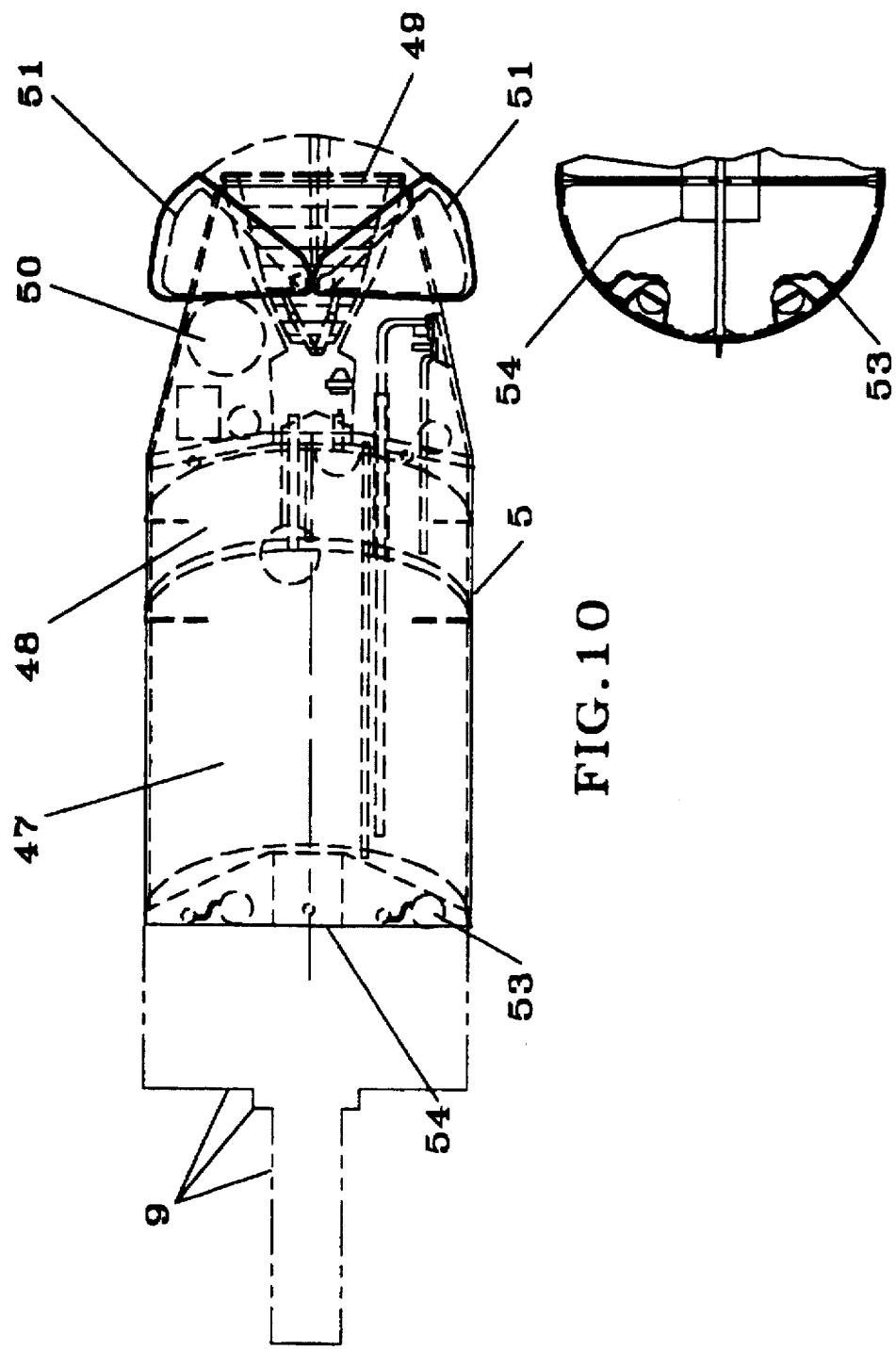

LOW EARTH ORBIT PAYLOAD LAUNCH SYSTEM

BACKGROUND OF THE INVENTION

1. Field of the Invention

This invention relates to vehicles used to place payloads such as satellites in low earth orbit. The new vehicle uses three stages comprised of a turbofan engine powered aircraft, a ramjet powered aerospacecraft and a rocket booster to place payloads in orbit.

2. Description of Related Art

There are currently in use several methods for launch of earth orbit payloads. These include rocket powered vehicles such as the French Ariane, Russian Proton, Chinese Long March, and various United States rockets. In addition there is the United States Space Shuttle system which is also a rocket powered system. The rocket powered vehicles other than the Space Shuttle have varying degrees of reliability or lack thereof and tend to be expensive as each must be assembled for the launch of a payload into orbit.

In the case of the United States Space Shuttle, the launch vehicle has proven to be reliable once launched; however, the process to prepare for a launch is time consuming and expensive. The Space Shuttle also has some reusable elements for purposes of reducing launch costs. Refurbishment of these reusable elements has proven to be expensive. Part of the Space Shuttle operation includes extensive facilities for launch operations which are located in only one place, Florida.

All of these systems use rockets that require stored propellants either solid or liquid, which includes fuel and oxidizer and does not take advantage of the oxygen available in the atmosphere. Achieving orbital speeds requires tremendous expenditures of propellants. For example, the Space Shuttle carries less than 2% of the gross lift-off weight as payload, with the remainder being mostly propellant and structure. Rockets like the Space Shuttle use tons of propellants every second the engines are functioning. Rocket engines typically require the propellants to be delivered at very high pressure which directly impacts turbomachinery cost, complexity and reliability.

Most of these rocket systems were designed to deliver large, heavy payloads. When used to launch orbital payloads they can be used to position large, heavy satellites in high earth orbits including geosynchronics orbits. However, the high cost and reliability issues inherent in the current systems as previously discussed have inhibited the large scale utilization of space.

Other methods have been proposed as exemplified in the background discussion in U.S. Pat. No. 4,265,416 and by the disclosure in U.S. Pat. No. 4,265,416, granted May 5, 1981 and others such as U.S. Pat. No. 4,802,639, granted Feb. 7, 1989 and U.S. Pat. No. 5,402,965, granted Apr. 4, 1995 which attempt to use horizontal takeoff carrier vehicles as an initial stage for boost of payloads into orbit. In such an approach turbofan engines may be used for a portion of the vehicle flight which allows use of the atmosphere and a reduction in the weight of oxidizer that must be carried. However, in the case of U.S. Pat. Nos. 4,265,416 and 4,802,639, an extensive design for an initial boost phase carrier or booster vehicle and orbiter vehicle is required. These are non-conventional elements involving technical risk regarding both viability and performance costs. In one instance use of a ramjet engine is proposed which technology for such an application would require development of unproven technology.

In the case of U.S. Pat. No. 5,402,965 use of a proven carrier boost vehicle is disclosed. The system uses a proven aircraft for the initial boost phase. For subsequent phases of flight including atmospheric stages a multistage rocket powered vehicle is disclosed. This again involves the inefficiencies discussed earlier in that rockets must provide their own oxidizer. From this disclosure it also appears that the payload vehicle or refly vehicle must be mounted on the end of a multistage rocket attached under the wing of a commercial aircraft. This system uses non-recoverable rocket boost stages.

The present invention uses a three stage vehicle to launch orbit payloads. The vehicle may also be used as a two or three stage vehicle for conducting experiments in space. The vehicle uses the appropriate aerodynamic vehicle and power source for each stage over its altitude operational range. A conventual turbofan powered aircraft such as a Lockheed C-5 or Antonov AN-124 is used for the horizontal take off and initial boost phase. This uses existing known low risk technology with modification for transport of the second and third stages.

The second stage carried under the wing of the turbofan aircraft is an aerospacecraft which is an ejector ramjet powered stage. The aerospacecraft is dropped from the aircraft and flies to an exo-atmospheric altitude. At this point the vehicle may be used in a space environment for example for conducting experiments in space. If it is desired to position a satellite in low earth orbit, the aerospacecraft carries a rocket booster with payload in its cargo bay. The rocket booster is released from the aerospace craft and boosts the payload such as a satellite into orbit.

All of these stages are recoverable and reusable. The aerospacecraft flies back to land on a conventual runway as does the aircraft. The rocket booster releases its payload and deorbits. As it descends in the atmosphere a parachute is deployed and the rocket booster is then recovered by a recovery aircraft. The first two stages use engines which allow use of the atmosphere for the fuel oxidizing agent which greatly reduces vehicle weight providing almost an order of magnitude improvement in performance compared to known rocket powered vehicles.

SUMMARY OF THE INVENTION

A primary objective of the present invention is to provide a minimum risk technology system for launch of low earth orbit payloads. A further object is to provide a satellite launch system which can launch under varying weather conditions at various sites around the earth. Another object is to maximize the use of the atmosphere for fuel oxidizer for the launch system. A further object is to provide less vehicle induced stress on the payload during the boost to orbit, a relatively softer ride. Another object is to provide flexible ability to replace a single failed satellite in a particular orbit. Another object is to provide a launch system in which all stages are normally reusable with reduced maintenance costs between launches. A further object is to provide a launch system which can utilize existing airfields as launch sites.

In accordance with the description presented herein, other objectives of this invention will become apparent when the description and drawings are reviewed.

BRIEF DESCRIPTION OF THE DRAWING

FIG. 2 illustrates a side elevation view of the turbofan aircraft.

FIG. 3 illustrates a front elevation view of the turbofan aircraft.

FIG. 4 illustrates a top plan view of the turbofan aircraft.

FIGS. 5 and 5A illustrate the parachute recovery system of the turbofan aircraft.

FIG. 8 illustrates a split top and bottom view of the aerospacecraft along the longitudinal centerline.

FIG. 9 illustrates a side elevation view of the aerospacecraft.

FIG. 10 illustrates a side cut away view of the booster rocket.

FIG. 11 illustrates an end view of the booster rocket.

DESCRIPTION OF THE PREFERRED EMBODIMENT

Figure 1:
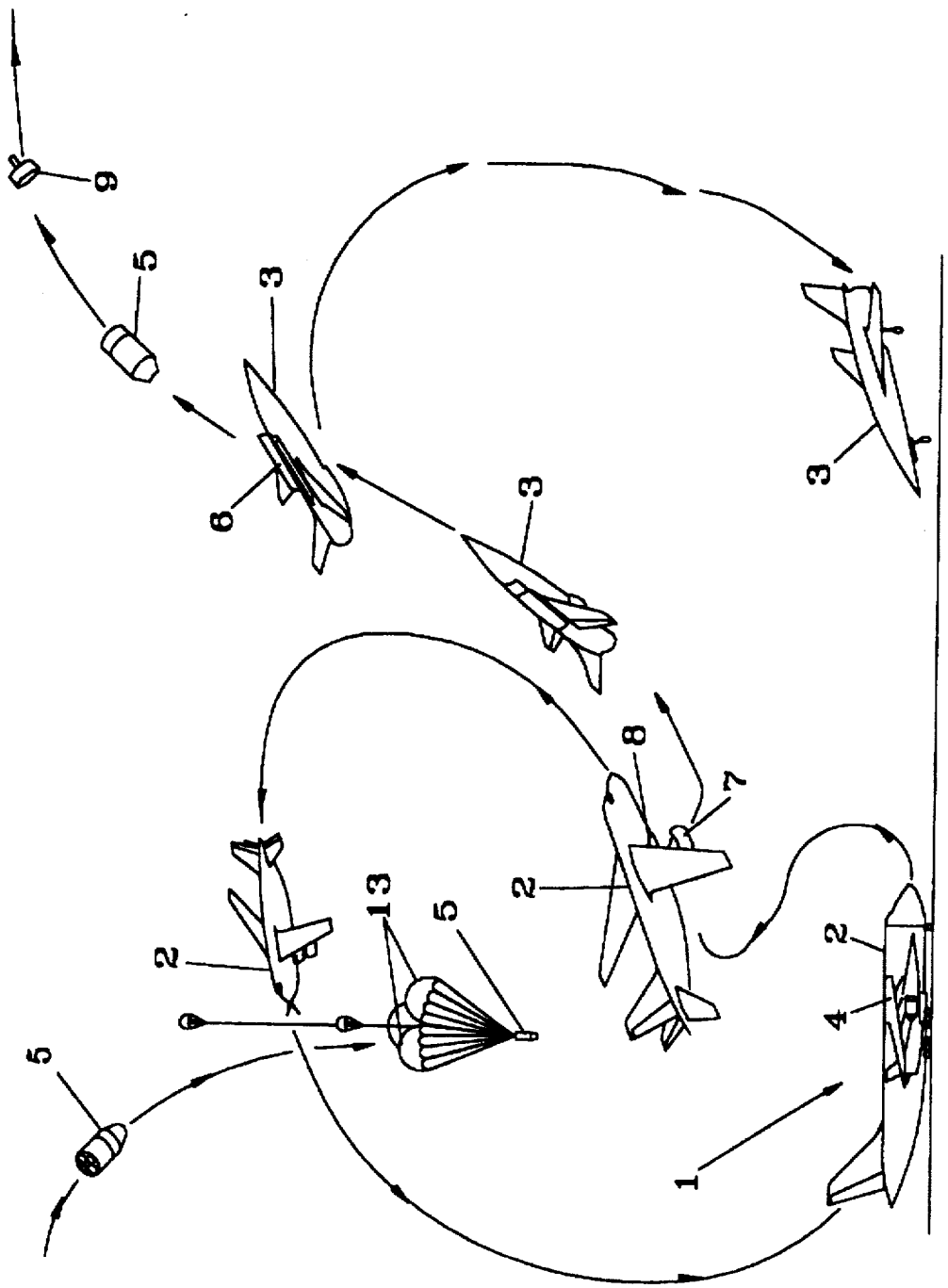
FIG. 1 illustrates the operational stages of the orbital launch system.

The orbital launch system is a three stage horizontal take off and flight to low earth orbit vehicle. It is comprised of a turbofan aircraft with an ejector ramjet aerospacecraft which carries a booster rocket to place a payload into orbit. The turbofan lift aircraft may take off from any conventional runway that is of sufficient length. The aircraft uses conventional equipment, facilities, fuels, etc. for the launch operations. After takeoff, the aircraft climbs to an altitude of nominally 35,000 feet and also flies to a position to facilitate placing the payload in the proper orbit. Once in position and at the proper altitude, this first stage releases the other stages which drop safely down and away from the first stage.

The second stage ejector ramjet aerospacecraft then climbs and accelerates while in the atmosphere. As the aerospacecraft ascends out of the atmosphere, the ramjets are turned off and the second stage continues to coast to a higher altitude for deployment of the third stage. The aerospacecraft cargo bay doors are opened to release the third stage booster rocket at nominally 300,000 feet for the typical low earth orbit satellite. The booster rocket (5) with payload (9) may be ejected from the cargo bay (6) by use of a sling and sling winch (not shown) or any other appropriate means. The booster rocket then climbs to an altitude of 1,650,000 feet and accelerates to a speed of approximately 25,000 feet per second.

For recovery, the aerospacecraft flies back and lands horizontally at an airfield. The booster rocket deorbits, deploys a parachute and is recovered by an aircraft having a parachute drop recovery system. The turbofan aircraft used as the first stage may be used for such a recovery or a second aircraft may be used. The first stage turbofan aircraft flies back to land at an airfield.

Referring to FIG. 1, the basic operational concept and elements of the orbital launch system (1) are depicted. A turbofan aircraft (2) of sufficient capacity, such as, the Lockheed C-5 or Antonov AN-124, has the aerospacecraft (3) attached under an aircraft wing (4) in preparation for launch. The booster rocket (5) and payload (9) are in the cargo bay (6). The preferred attachment point for the aerospacecraft (3) is at an inboard aircraft engine mount (7) after removal of the engine and pylon. An aerospacecraft pylon (8) is used to carry the aerospacecraft (3).

Referring to FIGS. 2 through 4, the aerospacecraft (3) is sized to provide adequate ground clearance during takeoff and landing of the turbofan aircraft (2) including non-optimal conditions such as roll of the turbofan aircraft (2), structural deflections under loads or flat tires on the landing gear. The turbofan aircraft (2) has a mission control and monitor station installed (not shown) which has an interface through the aerospacecraft pylon (8) for communication with the aerospacecraft (3), booster rocket (5) and payload (9). Also, the tail (10) and wings (11) of the aerospacecraft (3) are designed to provide clearance from the turbofan aircraft (2).

Figure 6:
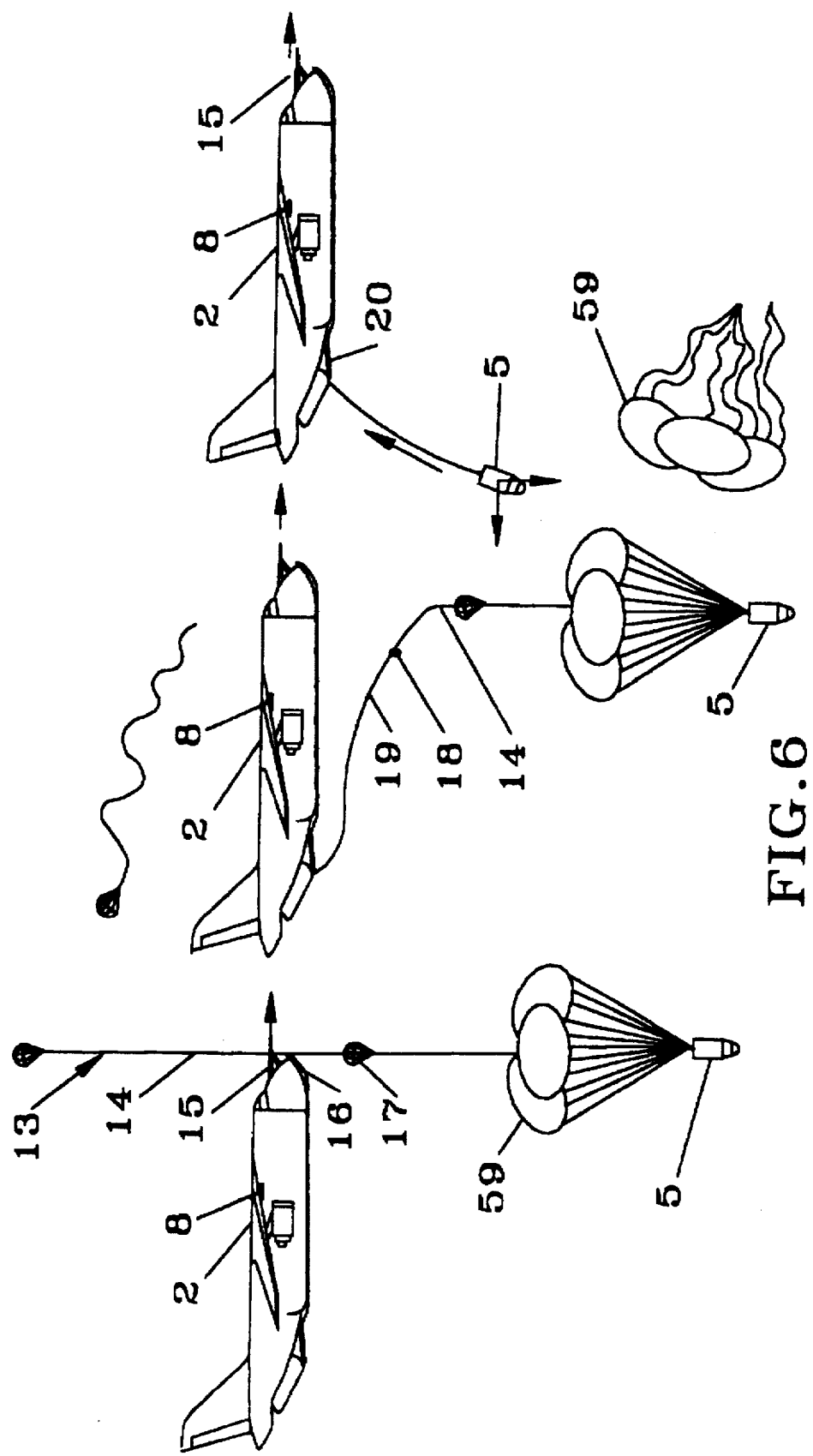
FIG. 6 illustrates the operation of the parachute recovering system.

Referring to FIGS. 5 and 6, the turbofan aircraft (2) is also sized to serve as the recovery vehicle for the third stage booster rocket (5). As illustrated in FIG. 5 the turbofan aircraft (2) is equipped with a parachute drop recovery system (12) of which the Fulton recovery system is one well known example. As the booster rocket (5) descends through the atmosphere under control of the deployed parachute recovery system (13), the turbofan aircraft (2) captures the upper parachute lift line (14) with capture yoke (15) at the aircraft nose (16). The then trailing booster rocket (5) is attached to the lower lift line parachute (17). The retrieval cable (19) is then attached with a winch line clasp (18) to the remains of the upper parachute lift line (14), the decent parachutes (59) are severed and the retrieval cable (19) reeled in to bring the booster rocket (5) to the aircraft cargo bay aft access (20) of the turbofan aircraft (2). The booster rocket (5) is then pulled into the aircraft cargo bay (21) by means of the winch (22).

Figure 7:
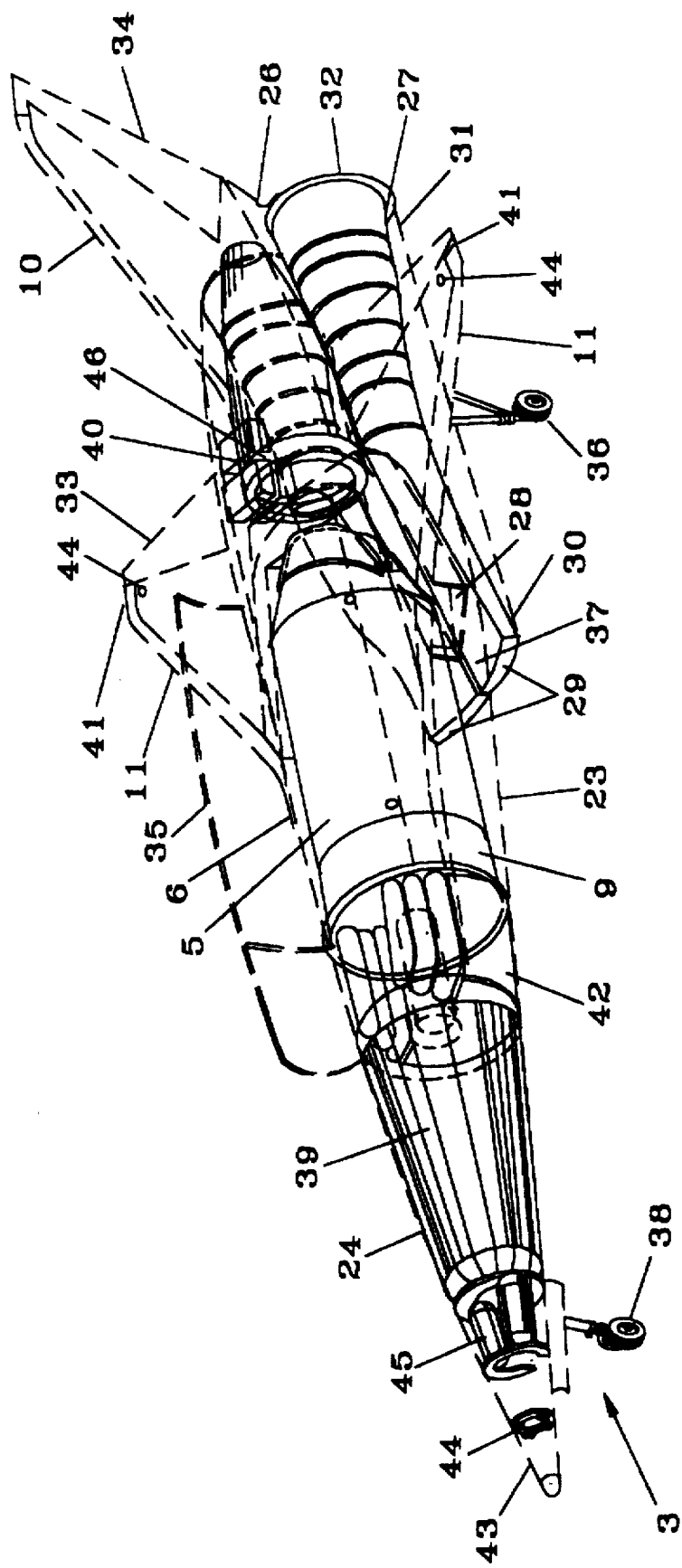
FIG. 7 illustrates a partially ghosted view of the aerospacecraft showing internal components.

FIG. 7 illustrates a perspective view of the aerospacecraft (3) with the airframe partially ghosted to show the internal arrangement of the components. FIGS. 8 and 9 show a split top and bottom plan view and a side elevation view respectively of the aerospacecraft (3). The fuselage (23) is a minimum drag fuselage with forebody (24) having a 7 degree lower forebody (58) for propulsion efficiency designed around the cargo bay (6). The wings (11) are span limited for carriage requirements of the turbofan aircraft (2) and are sized for the high speed pull-up to position the booster rocket (5) for orbital insertion. The wings (11) are positioned to minimize trim deflections during acceleration. Appropriate sized elevons (33) for maneuvers are provided. The aft body (25) is an ogival shape in which the vertical tail (10) and engine nacelles (31) are mounted. The vertical tail (10) has rudder (34) mounted thereon.

The nacelle inlet (29) locations for the ejector ramjet engines (27) are under the midsection (37). Nacelle planar fairings (30) continue aft between the aft body (25) and the engine nacelles (31) to the tail end (26) and engine exhaust nozzles (32). The air liquification nacelle inlets (28) and air liquification nacelles (57) are under the wings (11).

The aerospacecraft (3) is designed such that with the booster rocket (5) and payload (9) the center of gravity is near coincident with the aerospacecraft (3) empty center of gravity. This arrangement provides for minimal shift in the center of gravity of the aerospacecraft (3) as the rocket booster (5) with payload (9) is deployed through cargo bay doors (35). The aerospacecraft (3) has appropriately located retractable landing gear with one midsection landing gear (36) on each side of the aft body (25) and one nose landing gear (38).

There is a forward fuel tank (39) and aft fuel tank (40). To accommodate a variety of form factor payloads (9) an exchangeable formed fuel tank (42) may be used in the cargo bay (26). The nose end (43) and wing tips (41) have attitude control rockets (44) and position fuel tanks (45). The aft body (25) also houses the air liquification equipment (46).

FIGS. 10 and 11 illustrate the reusable booster rocket (5) on which the payload (9) is mounted. This combination is then placed in the cargo bay (6) prior to the aerospacecraft (3) being attached to the turbofan aircraft (2). The booster rocket (5) has a liquid hydrogen tank (47) and liquid oxygen tank (48) to fuel the rocket engine (49). Fuel tank pressurant units (50) are also appropriately located and connected to tanks (47, 48). The booster rocket (5) has rocket engine deployable re-entry covers (51) to protect the rocket engine (49) during atmospheric reentry. The rocket engine re-entry covers (51) are of a material to provide a heat shield to protect components and a proper shape to stabilize the vehicle during reentry. There is also an attitude control system (53). The stowed configuration of the parachute recovery system (54) is mounted on the opposite end from the rocket engine (49). For a low earth orbit satellite launch a booster rocket (5) of 350 inches length, 130 inches diameter and gross weight approximately 30,000 pounds can be sized to provide 31,000 pounds of thrust with a specific impulse of 450 seconds. With the proper deployment point by the aerospacecraft (3) the rocket booster (5) can place a 1760 pound satellite into a 1,650,000 foot circular polar orbit.

We claim:

1. An orbital launch system comprising:
   a) a turbofan aircraft modified with a means to carry and to release an aerospacecraft;
   b) the aerospacecraft comprising:
   i) a fuselage with a fore body, a midsection with a cargo bay having a plurality of cargo bay doors, and an aft body;
   ii) a pair of wings attached to the fuselage each defining a wing tip and having means for control to allow a high speed pull up maneuver and maneuver of the aerospacecraft and a tail with a rudder generally vertically mounted at a tail end;
   iii) two ejector ramjet engines each in an engine nacelle wherein there is a nacelle inlet and a nacelle planar faring for each ejector ramjet engine all generally located under a plane defined by the wings and the ejector ramjet engines each having an engine exhaust nozzle at the tail end of the fuselage;
   iv) a forward fuel tank and an aft fuel tank in the fuselage and connected to the ejector ramjet engines;
   v) a plurality of attitude control rockets connected with a plurality of position fuel tanks and mounted in a nose end of the fore body and each wing tip;
   vi) a means to carry and to launch a payload; and
   vii) a means for a horizontal landing.

2. The orbital launch system as in claim 1 wherein the means for control is an elevon in each of the wings.

3. The orbital launch system as in claim 1 wherein the means to carry and to release is an aerospacecraft pylon attached at an aircraft engine mount under a wing of the turbofan aircraft.

4. The orbital launch system as in claim 1 wherein the means for a horizontal landing is two midsection landing gear and a nose landing gear.

5. The orbital launch system as in claim 1 wherein the means to carry and launch the payload is the payload attached to a booster rocket contained in the cargo bay having a means for ejection and the booster rocket comprising:
   a rocket engine with a liquid hydrogen tank and a liquid oxygen tank attached; a pair of re-entry covers for the rocket engine; a plurality of pressurant units connected to the liquid hydrogen tank and the liquid oxygen tank; an attitude control system; and a parachute recovery system.

6. The orbital launch system as in claim 5 wherein the turbofan aircraft includes a parachute drop recovery system for recovery of said booster rocket having a parachute recovery system wherein the parachute drop recovery system comprises a capture yoke attached at a nose portion of the turbofan aircraft, a retrieval cable and a winch wherein a winch line clasp is attachable to an upper parachute lift line of the parachute recovery system; and an aircraft cargo bay with aft access.

7. The orbital launch system as in claim 1 wherein the cargo bay includes therein a formed fuel tank connected to the ejector ramjet engines.

8. The orbital launch system as in claim 1 wherein there air liquification cooling equipment is mounted in the aft body wherein the air liquification equipment having an air nacelle inlet with an air liquification nacelle under each wing and the air liquification equipments is connected to the ejector ramjet engines.

* * * * *